United States Patent [19]

Kikuchi

[11] Patent Number: 4,840,334

[45] Date of Patent: Jun. 20, 1989

[54] FASTENER FOR FASTENING ELONGATE OBJECT

[75] Inventor: Akio Kikuchi, Yokohama, Japan

[73] Assignee: Nifco, Inc., Yokohama, Japan

[21] Appl. No.: 156,630

[22] Filed: Feb. 17, 1988

[30] Foreign Application Priority Data

Feb. 17, 1987 [JP] Japan .............................. 62-21741[U]

[51] Int. Cl.$^4$ .............................................. F16L 3/08
[52] U.S. Cl. .................................... 248/73; 248/74.2;
411/508; 24/453
[58] Field of Search .................... 248/73, 74.2, 74.5,
248/74.3; 24/453, 297, 616, 325, 305; 174/138
D; 292/DIG. 38; 411/508-510

[56] References Cited

U.S. PATENT DOCUMENTS

| | | | |
|---|---|---|---|
| 3,024,509 | 3/1962 | Hamann | 248/73 |
| 3,393,431 | 7/1968 | Saunders | 411/508 |
| 4,143,577 | 3/1979 | Eberhardt | 174/138 DX |
| 4,506,419 | 3/1985 | Mitomi | 411/508 X |
| 4,527,821 | 7/1985 | Tanaka | 292/DIG. 38 X |

FOREIGN PATENT DOCUMENTS

| | | | |
|---|---|---|---|
| 2921956 | 12/1980 | Fed. Rep. of Germany | 411/508 |
| 1342218 | 12/1963 | France | 411/508 |

*Primary Examiner*—Alvin C. Chin-Shue

*Attorney, Agent, or Firm*—Schwartz & Weinrieb

[57] ABSTRACT

A plastic one-piece molding fastener for an elongated object includes a holding portion for holding an elongated object, first and second leg portions depending from the holding portion, first and second elastic locking portions extending from the ends of the respective first and second leg portions toward the bottom of the holding portion so as to define therewith substantially U-shaped members, locking shoulders provided on the first and second elastic locking portions for being engaged with the edge and undersurface of a mounting hole of a mounting plate within which the elongated object is to be secured, and first and second lever portions extending in opposite directions from upper portions of the elastic locking portions and perpendicular to the axial direction of the fastened elongated object and inclined downwardly with respect to the bottom of the holding portion. The first and second leg portions are serially arranged or aligned in the axial direction of the fastened elongated object and are staggered with respect to each other in a perpendicular direction with respect to the axial direction of the fastened elongated object. The first and second elastic locking portions project outwardly in directions perpendicular to the axial direction of the fastened elongated object and are disposed upon opposite sides of the longitudinal axis of the fastener.

14 Claims, 5 Drawing Sheets

FASTENER FOR FASTENING ELONGATE OBJECT

BACKGROUND OF THE INVENTION

1. Field of the Invention

This invention relates to a fastener, which is a one-piece molding formed of plastic material to be secured within a mounting hole defined within a support panel for mounting an elongated object upon the support panel.

2. Description of the Prior Art

Wires, pipes and other elongated objects (hereinafter generally referred to as elongated objects) mounted within a vehicle interior, for instance, should have their intermediate portions held and secured.

The elongated object fastener of this type should not only be readily secured or locked at a fixed location while holding an elongated object but should also be capable of being removed from the locked place for such purposes as repair and inspection.

U.S. Pat. No. 4,334,659 discloses a fastener which has operable portions projecting from the opposite sides thereof. FIGS. 9 and 10 shows this fastener. The fastener illustrated has a holder portion 1. To fasten an elongated object 2, the object 2 is surrounded by means of the holder portion 1 and then opposite side leg portions 5a and 5b are inserted in a state of close contact with each other into a mounting hole 3' defined within a mounting plate 3 by pushing the fastener in the direction of the arrow shown in FIG. 9. In this way, the fastener is secured within the support plate 3 as shown in FIG. 10. More specifically, in this state the mounting plate 3 is clamped between locking portions 6a and 6b projecting outwardly from the opposite side leg portions 5a and 5b and mating lower edges 4a and 4b of the holder portion 1. That is, the locking portions 6a and 6b engage the inner peripheral edge of the mounting hole 3' so that the fastener is secured within the plate or panel 3. The fastener has operable portions 9a and 9b extending in an upwardly inclined direction from the top of the locking portions 6a and 6b.

In the above state of the fastener secured within the mounting hole 3', by pushing the opposite sides of the operable portions 9a and 9b with one's fingers in the directions of the arrows shown in FIG. 10, the locking portions 6a and 6b are displaced inwardly. In this state, the fastener can be withdrawn upwardly from the mounting hole 3'.

With the prior art fastener as shown in FIGS. 9 and 10, however, large forces tend to be exerted upon the fastener in the longitudinal direction of the elongated object, which is held by the fastener, when the object undergoes severe vibrations caused by means of vibration of the vehicle during vibration. In such case, a positional deviation or rattling of the fastener is liable to result because the fastener is only secured within the mounting plate or panel 3 as a result of the opposite side locking portions 6a and 6b being disposed within the same or common transverse plane relative to the edge of the mounting hole 3'.

Furthermore, with this fastener the portion of the mounting plate 3 surrounding the mounting hole is clamped between the top of the locking portions 6a and 6b and the lower edges 4a and 4b of the holder portion 1. Therefore, the mounting plate 3 is required to have a specific thickness. If the thickness is excessive, the fastener cannot be locked. If the thickness is insufficient, the fastener cannot be locked sufficiently stably, and rattling will occur.

OBJECT OF THE INVENTION

The present invention has been made in light of the above, and its object is to provide an elongated object fastener which is less liable to undergo positional deviation or rattling due to vibration, never becomes accidentally detached, and can be firmly locked in a mounting plate even if the thickness dimensions of different mounting plates are different from each other.

SUMMARY OF THE INVENTION

To attain the above object of the invention, there is provided a fastener for fastening an elongated object, which consists of a one-piece plastic molding comprising:

a holding portion for holding an elongated object;

first and second leg portions depending from said holding portion such that they extend in the axial direction of the elongated object to be fastened and are staggered with respect to each other in a perpendicular direction to said axial direction;

first and second elastic locking portions extending from the end of said respective first and second leg portions toward the bottom of said holding portion such that they swell or project outwardly in directions different from the axial direction of said fastened elongated object, said first and second elastic locking portions being provided with locking shoulders to be engaged with the edge of a mounting hole; and first and second lever portions extending from portions of said first and second elastic locking portions adjacent to and on their side opposite said locking shoulders outwardly in directions different from the axial direction of said fastened elongated object and inclined downwardly from the side of the bottom of said holding portion.

With this structure of the fastener, by forcibly inserting the first and second elastic locking portions thereof through the mounting hole, a portion of the mounting plate surrounding the mounting hole is clamped between the top of the first and second elastic locking portions, which are staggered with respect to each other in the axial direction of a holding groove for the elongated object, and second lever portions projecting outwardly and inclined downwardly away from the bottom of the holder portion. The tops of the first and second elastic locking portions are thus firmly engaged with the edge of the mounting hole by means of outwardly directed elastic forces as well as vertically directed elastic forces. To remove the fastener from the mounting hole, the first and second lever portions are pushed inwardly so as to disengage the shoulder portions of the first and second elastic locking portions from the edge of the mounting hole. In this state, the fastener can be withdrawn from the mounting hole.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENTS

Figure 1:
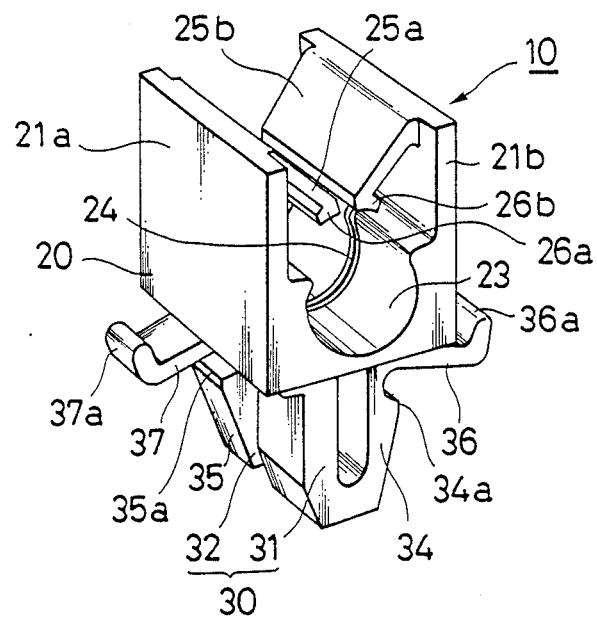
FIG. 1 is a perspective view showing an embodiment of the elongated object fastener according to the invention.
Figure 2:
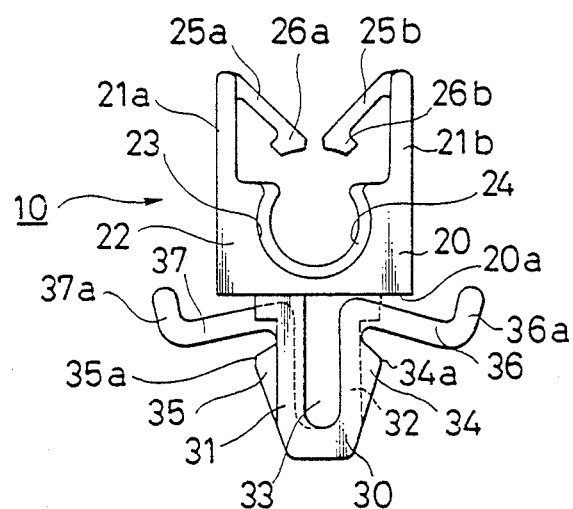
FIG. 2 is a front view showing the fastener of FIG. 1.
Figure 3:
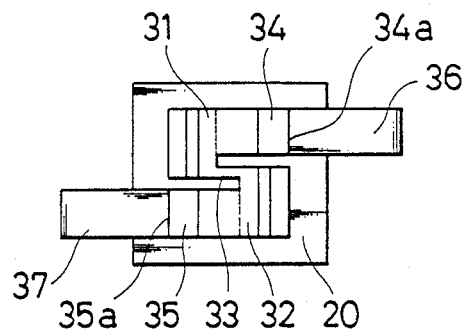
FIG. 3 is a bottom view showing the fastener of FIG. 1.
Figure 4:
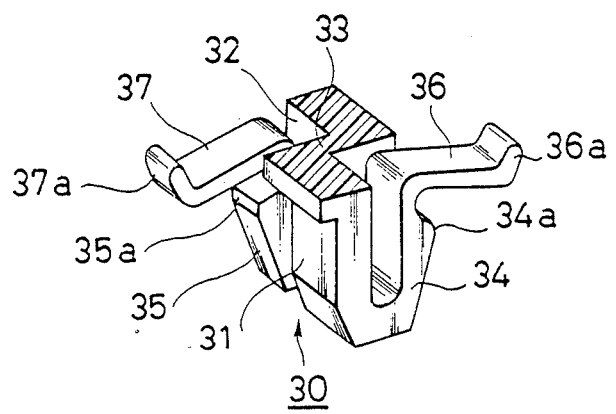
FIG. 4 is a perspective view showing a locking portion of the fastener of FIG. 1.

FIGS. 1 to 4 illustrate one embodiment of the elongated object fastener 10 according to the invention. The fastener 10 is a one-piece molding made from a plastic material.

The fastener 10 has a holding portion 20, which has opposed upstanding parallel side walls 21a and 21b having a relatively small thickness and a relatively bottom wall 22 having a large thickness. The bottom wall 22 is formed along the entire length thereof with a holding groove 23 having an arcuate or substantially semicircular cross sectional profile and extending parallel to the side walls 21a and 21b for holding an elongated object A. A circumferential inner ridge 24 projects radially inwardly from a central portion of the holding groove 23 as considered along the axial length thereof.

Inwardly projecting plate-like portions 25a and 25b extend from the upper end of the side walls 21a and 21b such that they approach each other in a downwardly inclined fashion. The inclined plate-like portions 25a and 25b are provided at their free ends with respective contact portions 26a and 26b having contact surfaces forming substantially a continuation of the same cylindrical surface as the surface defined by means of the holding groove 23.

Figure 5:
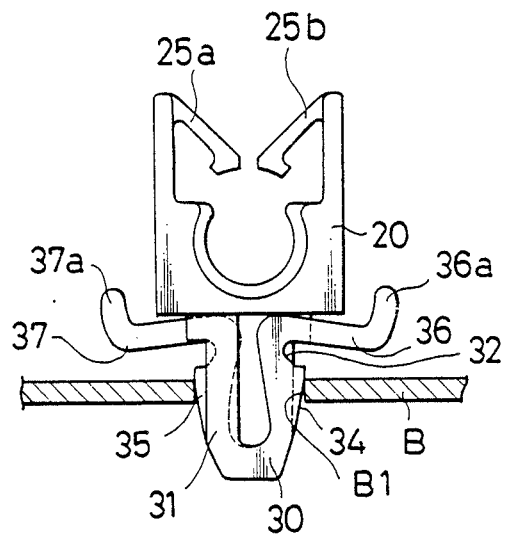
FIG. 5 is a front view showing the fastener of FIG. 1 with the locking portion being inserted through a mounting hole of a mounting plate.
Figure 6:
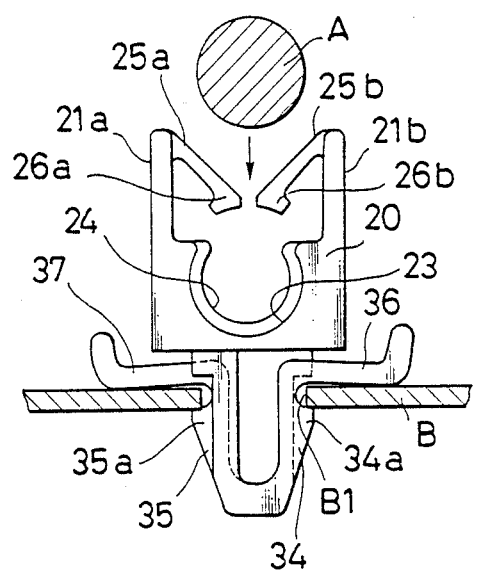
FIG. 6 is a front view showing the fastener of FIG. 1 having been locked within the mounting hole and plate of FIG. 5.

A locking portion 30, which is to be insertedly locked within a mounting hole B1 of a mounting plate B, as best seen in FIGS. 5 and 6 depends from the lower surface 20a of the holding portion 20.

As shown in FIGS. 1 to 4, the locking portion 30 consists of first and second leg portions 31 and 32, which are aligned or serially arranged in the axial direction of the holding groove 23 such that they are staggered with respect to each other in a direction perpendicular to the axis of the holding groove 23 and are united with each other by means of a uniting portion 33. First and second elastic locking portions 34 and 35 extend from the free end of the first and second leg portions 31 and 32 toward the lower surface 20a of the holding portion 20 so as to project outwardly in opposite directions perpendicular to the axial direction of the holding groove 23. The first and second elastic locking portions 34 and 35 have respective locking shoulders 34a and 35a, which are to be engaged with an edge or undersurface portion of the mounting hole B1 of the mounting plate B.

First and second lever portions 36 and 37 extend from upper portions of the first and second elastic locking portions 34 and 35 at positions above the locking shoulders 34a and 35a that is, at positions opposite the upper ends of portions 31 and 32 which are affixed to the undersurface of the holding portion 20 in opposite directions transversely to and away from the central axis of the fastener as defined, for example, by means of holding groove 23, and are inclined downwardly relative to the undersurface of the holding portion 20. The first and second lever portions 36 and 37 are provided at their free ends with respective L-shaped operable portions 36a and 37a.

The operation of the fastener having the above construction will now be described.

When the locking portion 30 is forcibly inserted through the rectangular mounting hole B1 of the mounting plate B, the first and second elastic locking portions 34 and 35 are flexed inwardly in contact with the edge of the mounting hole B1, as shown in FIG. 5. When the locking portion is further inserted until the locking shoulders 34a and 35a clear the mounting hole B1, the first and second elastic locking portions 34 and 35 are restored by their elastic restoring forces, as shown in FIG. 6 to their outward unflexed original state. In this state, the locking shoulders 34a and 35a are engaged with the edge of the mounting hole B1 and the undersurface of the plate or support panel B, and end portions of the first and second lever portions 36 and 37 are in contact in an upwardly flexed fashion with the upper surface of the mounting plate B. It is to be understood that owing to the deformation of the lever portions 36 and 37, the fastener can be locked without the possibility of rattling within the mounting plate B even if the thickness thereof is different from an intended or predetermined thickness.

In this locked or mounted state of the fastener, the elongated object A is fastened. To fasten the object A, it is moved into contact against the inclined plate-like portions 25a and 25b and then pushed downwardly. As a result, the side walls 21a and 21b are flexed outwardly, while the inclined plate-like portions 25a and 25b are flexed downwardly, thus permitting the elongated object A to pass between the contact portions 26a and 26b defined upon the ends of the inclined plate-like portions 25a and 25b. The elongated object A is thus clamped between the surface of the holding groove 23 and contact portions 26a and 26b. In this state, the elongated object A is strongly engaged with the ridge 24 of the holding groove 23. This has the effect of reinforcing the clamped state of the elongated object A in the case where the object is flexible.

Figure 7:
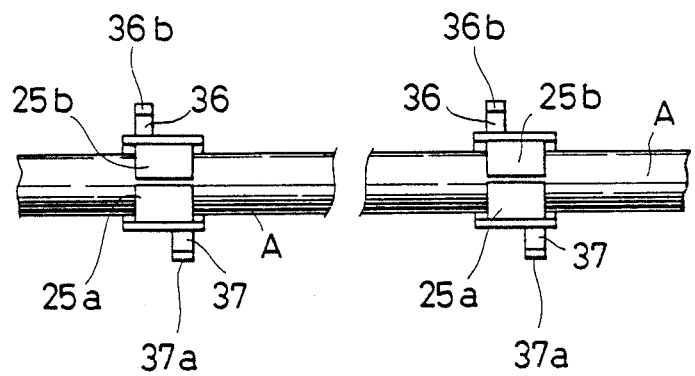
FIG. 7 is a fragmentary plan view, a reduced scale, showing an elongated objected secured within a support panel by means of fasteners of the present invention.

In the above mode, the elongated object A may be fastened to the mounting plate B by means of a plurality of fasteners suitably spaced apart and each having the locking portion 30 thereof locked within each mounting hole B1 of the mounting plate B, as shown in FIG. 7. In this state of the elongated object A, even if the object A experiences an axial tensile force produced as a result of its vibration due to various causes attendant the operation of the vehicle, there is no possibility of axial deviation, rattling, tilting or detachment of the locked fastener because two portions thereof which are staggered in the axial direction of the elongated object A (that is, locking shoulders 34a and 35a of the first and second elastic locking portions 34 and 35) and disposed upon opposite sides of the longitudinal axis of the fastener, are engaged with the edge of the mounting hole B1, while the mounting plate B is clamped between the shoulders 34a and 35a and lever portions 36 and 37.

To remove the fastener from the mounting hole B1, the operable portions 36a and 37a of the first and second lever portions 36 and 37 are pushed inwardly. As a result, the first and second elastic locking portions 34 and 35 are flexed inwardly. In this state, the locking portion 30 may be withdrawn upwardly.

Figure 8:
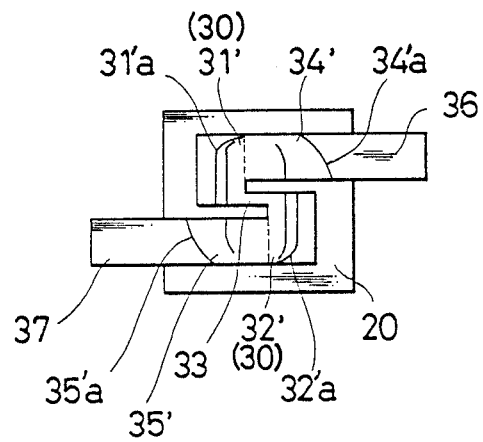
FIG. 8 is a bottom view showing a different embodiment of the fastener according to the invention.
Figure 9:
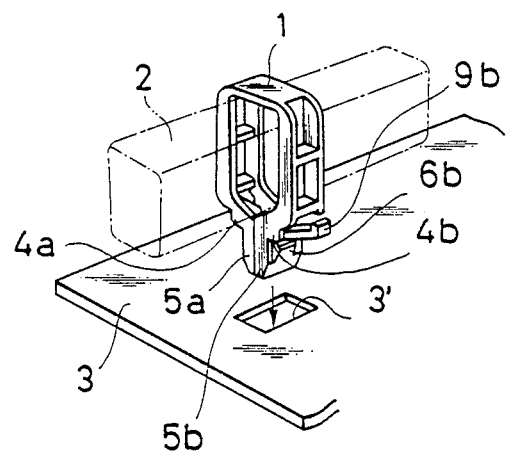
FIG. 9 is a perspective view showing a prior art elongated object fastener.
Figure 10:
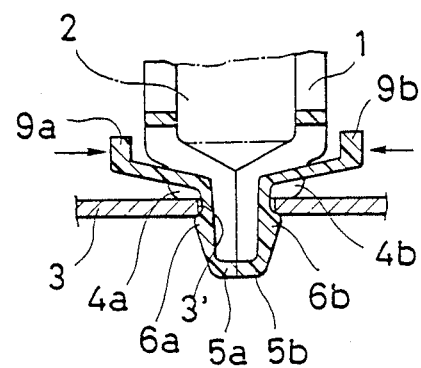
FIG. 10 is across-sectional view showing the fastener of FIG. 9 having been locked within a mounting hole of a mounting plate.

FIG. 8 shows a different embodiment of the invention. This embodiment has a circular locking portion 30 so that the fastener is adapted for use in a case where the mounting hole B1 of the mounting plate B is a circular hole.

In this case, the outer peripheries 31'a and 32'a of first and second leg portions 31' and 32' constitute portions of a circle, and the outer peripheries of shoulder portions 34'a and 35'a of first and second elastic locking portions 34' and 35' constitute portions of a circle having a greater diameter than the diameter of a circle constituted by the outer peripheries 31'a and 32'a of the first and second leg portions 31' and 32'.

Thus, when the locking portion 30 is inserted through the circular mounting hole B1 of the mounting plate B, the first and second elastic locking portions 34' and 35' are flexed inwardly with the circular outer peripheries thereof disposed in contact with the peripheral edge of the circular mounting hole B1. When the locking portion 30 is further inserted until the locking shoulders 34'a and 35'a clear the mounting hole B1, the first and second elastic locking portions 34' and 35' are restored to their natural unflexed positions, so that the fastener is locked within the mounting plate B.

The above embodiments of the invention are by no means limitative, and various changes and modifications may be made in the details of various parts. For example, the configuration of the holding portion 20 may be variously modified as desired so long as the elongated object A can be retained therein.

As has been shown in the foregoing, with the elongated object fastener constructed according to the invention, even if the fastened object experiences an axial tensile force produced as a result of its vibration due to various causes inherently produced as a result of the operation of the vehicle, there is no possibility of axial deviation, rattling, tilting, or detachment of the locked fastener, because two portions thereof which are staggered in the axial direction of the elongated object A (that is, the locking shoulders of the first and second elastic locking portions), and are disposed upon opposite sides of the longitudinal axis of the fastener, are engaged with the edge of the mounting hole while the mounting plate is clamped between the shoulders and the lever portions of the fastener.

Furthermore, since the shoulder portions are engaged with one side of the mounting plate portion surrounding the mounting hole while end portions of the first and second lever portions are urged by elastic forces against the other side of the mounting plate portion as noted above, the fastener can be locked firmly within the mounting plate and without possibility of rattling even if the mounting plate has a thickness different from an intended or predetermined thickness.

What is claimed is:

1. A plastic one-piece molded fastener for mounting an elongated object upon a support panel having an aperture defined therein for reception of a portion of said fastener, comprising:

means for holding said elongated object, having a longitudinal axis defined therein, such that said longitudinal axis of said elongated object extends in a predetermined axial direction with respect to said holding means so as to define an axial plane within said fastener;

first, substantially U-shaped leg means having a first leg portion thereof having one end fixedly secured to an undersurface portion of said holding means which is disposed upon a first side of said axial plane of said fastener, and a second leg portion thereof, cantilevered from the other end of said first leg portion so as to be resiliently flexible with respect to said first leg portion thereof and thereby permit entrance of said first substantially U-shaped leg means into said aperture defined within said support panel, having means thereon for engaging undersurface and upper surface portions of said support panel when said first substantially U-shaped leg means of said fastener is disposed within said aperture defined within said support panel, said second leg portion of said first substantially U-shaped leg means being disposed upon a second opposite side of said axial plane of said fastener such that a hollow portion of said first substantially U-shaped leg means as defined between said first and second leg portions thereof is disposed substantially within said axial plane of said fastener; and second, substantially U-shaped leg means having a first leg portion thereof having one end fixedly secured to an undersurface portion of said holding means which is disposed upon said second opposite side of said axial plane of said fastener, and a second leg portion thereof, elastically fixed to said first leg portion thereof so as to be resiliently flexible with respect to said first leg portion thereof and thereby permit entrance of said second substantially U-shaped leg means into said aperture defined within said support panel, having means thereon for engaging undersurface and upper surface portions of said support panel when said second substantially U-shaped leg means of said fastener is disposed within said aperture defined within said support panel, said second leg portion of said second subtantially U-shaped leg means being disposed upon said first side of said axial plane of said fastener such that a hollow portion of said second substantially U-shaped leg means as defined between said first and second leg portions thereof is disposed substantially within said axial plane of said fastener whereby said hollow portions of said first and second substantially U-shaped leg means, and said first and second substantially U-shaped leg means, are substantially co-axially disposed with respect to each other along said axial plane of said fastener.

2. A fastener as set forth in claim 1, wherein said means disposed upon said second leg portion of said first and second substantially U-shaped leg means for engaging said undersurface and upper surface portions of said support panel, comprises:

cantilevered lever means integrally formed with an upper end portion of said second leg portion of each of said first and second substantially U-shaped leg means for flexibly engaging said upper surface portions of said support panel; and shoulder means provided upon an external surface portion of said second leg portion of each of said first and second substantially U-shaped leg means at a position beneath and spaced from said lever means for engaging said undersurface portions of said support panel such that said support panel is interposed between said lever means and said shoulder means.

3. A fastener as set forth in claim 2, wherein:
said lever means project outwardly from said upper end portion of each second leg portion in a direction substantially perpendicular to said axial plane of said fastener.

4. A fastener as set forth in claim 2, wherein:
said lever means are provided at free end portions thereof with substantially L-shaped finger-engaging means for facilitating movement of said second leg portions of said first and second substantially U-shaped leg means in a direction which will permit disengagement of said fastener from said support panel.

5. A fastener as set forth in claim 1, wherein said holding means comprises:
a base portion having a substantially semi-circular cross-sectional configuration for supporting a lower surface portion of said elongated object.

6. A fastener as set forth in claim 5, further comprising:
upstanding sidewalls projecting upwardly from opposite sides of said base portion; and
means projecting inwardly from said sidewalls, and toward each other, for engaging upper surface portions of said elongated object whereby said inwardly projecting means cooperate with said base portion for confining said elongated object therebetween.

7. A fastener as set forth in claim 6, wherein:
said inwardly projecting means are inclined downwardly and are flexibly integral with said sidewalls so as to permit entry of said elongated object past said inwardly projecting means and into a hollow cavity defined by said base portion and said inwardly projecting means.

8. A fastener as set forth in claim 7, wherein:
free end portions of said inwardly projecting means comprise arcuate engagement means for engaging said elongated object and for defining said cavity with said base portion so as to have a substantially circular configuration as viewed in cross-section.

9. A fastener as set forth in claim 1, wherein:
said first leg portions of said first and second substantially U-shaped leg means have predetermined axial lengths extending in said axial direction; and
a transversely disposed web means interconnects a downstream end portion of said first leg portion of said first substantially U-shaped leg means with an upstream end portion of said first leg portion of said second substantially U-shaped leg means as viewed in said axial direction.

10. A fastener as set forth in claim 9, wherein:
said web means is integral with said first leg portions of said first and second substantially U-shaped leg means.

11. A fastener as set forth in claim 9, wherein:
said web means is disposed substantially perpendicular to said axial plane of said fastener.

12. A fastener as set forth in claim 1, wherein:
external peripheral surfaces of said first and second leg portions of said first and second substantially U-shaped leg means have substantially rectangular configurations in cross-section so as to be accommodated within a substantially rectangularly configured aperture defined within said support panel.

13. A fastener as set forth in claim 1, wherein:
external peripheral surfaces of said first and second leg portions of said first and second substantially U-shaped leg means have substantially arcuate configurations in cross-section so as to be accommodated within a substantially circularly configured aperture defined within said support panel.

14. A fastener as set forth in claim 2, wherein:
said lever means project downwardly toward said shoulder means in an inclined manner so as to flexibly accommodate support panels of different thickness dimensions.

* * * * *